Patented Apr. 6, 1937

2,076,112

UNITED STATES PATENT OFFICE 2,076,112

MASTICABLE MATERIAL

John O. Barker, New York, N. Y., assignor to Sweets Laboratories, Inc., New York, N. Y., a corporation of New York No Drawing. Application January 30, 1930, Serial No. 424,719. Renewed July 12, 1935

19 Claims. (Cl. 99—135)

The present invention relates to an improvement in the manufacture of chewing gum, as described herein and as more particularly pointed out in the appended claims.

The important novel feature of the present invention comprises the addition of a very soft mineral material such as finely pulverized talc or soap-stone, to the chewing gum base. Talc is, as is well known, a hydrous magnesium silicate, very soft in character (hardness, Moh's scale ordinarily about 1) and preferably, although not necessarily, I employ the light colored talc such as white or light greenish or light grayish color, rather than the darker varieties. In place of talc I may use other very soft silicate materials such as prochlorite, steatite, sepiolite or pyrophyllite, electing those varieties having a hardness not over 1.5.

These materials, of which talc is the most preferable one, are ground to an impalpable powder, and may be first washed with water or other suitable purifying agent if desired, and dried.

These materials are entirely different from certain artificial relatively hard materials which have been heretofore added to chewing gum for specific purposes (to the addition of which materials, no claim is made herein), such as precipitated chalk, precipitated calcium phosphate, ground charcoal, finely powdered emery or carborundum and such materials cannot be considered as the equivalent of talc, which is, as above stated, extremely soft.

The expression "chewing gum material" (in the singular or plural form) used in this specification and in the claims thereof, is intended to cover chewing gum itself and chewing gum base, and these only.

The chewing gum base may be any of those well known in the art, and the invention has been found to give very satisfactory results when used with a mixture made from hydrogenated oil and resinous material associated with rubber. Patents of H. V. Dunham, of April 21, 1925, cover the use of such mixtures in chewing gum. The invention has also given very satisfactory results when used in chewing gum containing coumarone resin, the use of this resin having been proposed heretofore by Weber.

While I have referred above to specific mixtures, it is obvious that the addition of the soft mineral substance of the type described herein to chewing gum material having excessive stickiness, is within the scope of the invention. The invention covers the addition of the soft mineral substance to various chewing gum materials which contain low grade or resinous rubbers, asphaltic or tarry materials, synthetic or natural tacky resinous constituents, excessive amounts of oily constituents, and chewing gum materials, that on account of excessive quantities of natural or synthetic gums, balsams, flavoring materials of an oily nature or which contain oils (e. g. chocolate) have been rendered sticky.

The amount of talc to be added to the chewing gum base can vary between rather wide limits. In some cases satisfactory improvement in the properties of the chewing gum have been produced by the addition of 3 to 5% of talc, whereas in other cases up to 15% or even more of the talc has been found advantageous. There is no objection to including a relatively large amount of talc in the chewing gum base, since talc is cheaper than most of the other constituents of chewing gum base.

For many purposes I have found that very satisfactory results may be produced by incorporating the talc, in the finely divided condition as above indicated with coumarone resin, which is to be included as a constituent of the chewing gum base. For this purpose 1 part of the powdered talc can be added to 2 to 5 parts of the said resin, for example while the resin is in a molten condition or semi-molten condition, and the resin thereafter reduced to a powder.

The talc has an important function in regulating the consistency and stickiness of the chewing gum or chewing gum base. Heretofore it has been customary in making balls of chewing gum, to first form a ball of the chewing gum base, or a ball of the mixture of chewing gum base with flavoring material, sugar and the like, these balls being laid upon a suitable tray or table, and considerable difficulty has been encountered on account of the fact that the balls, if laid on the table for any length of time are likely to become flattened on the bottom, making it necessary to again shape the balls before coating them with a candy mixture. When talc is added as above indicated difficulties from this source are considerably reduced.

Gum containing the talc does not stick to the teeth and to the interior of the person's mouth, as badly as some kinds of gum to which the talc is not added. I have found that it is possible to overcome any objectionable stickiness of the gum, particularly gums made from or containing rubber, by the use of talc. The use of talc may even to some extent overcome the objectionable sticking of chewing gum to the lips of the user, which has heretofore been a source of annoyance considerably restricting the sale of "bubble gum".

No claim is made herein for any pharmaceutical value of talc, but it is found that the same is in no way injurious to the users of the gum, from the standpoint of health.

Chemically talc is apparently inert and is not, so far as I have found, dissolved or otherwise changed in the mouth during the mastication of the gum, it does not swell nor come out of the gum, during chewing.

In cases where medicinal agents are to be added to the gum, the finely pulverized talc constitutes an admirable agent for incorporating such medicinal agent, whether in a dry form or in the form of a liquid. Thus the dry finely pulverized talc may be first sprayed with the liquid medicinal agent, which it will readily absorb up to considerable quantities, and the so treated talc can then be incorporated in the chewing gum, or with any of the materials which go to make up the chewing gum, the materials already having been sufficiently purified or chemically treated.

The talc being a very soft material does not in any manner injure the teeth of the consumers, and may have some effect in scrubbing off film or deposits on the teeth, and it does not constitute a harmful grit or crude abrasive.

Talc of course has no flavor, but in some cases it appears to act as a reservoir for holding the flavor added, for slowly releasing the same during the mastication of the gum. This can be demonstrated by spraying the flavoring material in a liquid condition on the fined powdered talc, which is subsequently mixed with the completed chewing gum base or with some of the components of the chewing gum base, and during the chewing of the gum, the flavoring slowly leaches out into the fluids of the mouth, giving a more gradual solution of the flavoring material, and hence making the flavor last longer when the gum is chewed.

This latter is a highly important advantage, because most people throw away the gum as soon as (or shortly after) the flavor has left the gum. Any means by which the flavor can be made to last longer in the gum, consequently is an important advance in the chewing gum art.

I call attention to the fact that the talc which I add is a mineral, and a mineral of very great softness thereby distinguishing from certain artificial products such as chalk (precipitated chalk), di-calcium or tri-calcium phosphate (precipitated calcium phosphate) and the like, which are artificial products, and which are relatively hard as compared with talc.

Talc is described in the literature as having a "greasy feel". It has heretofore been used in certain kinds of lubricants, and has a lubricating action. It may be described as a "very soft, siliceous, solid mineral lubricant having anti-sticking qualities," which expression also is an apt expression to include its equivalents as mentioned above.

In the appended claims, it is not intended to cover, by such terms as "soft native mineral", "mineral substance", and the like, such materials as mineral oils, paraffin wax and asphalts, which are hydrocarbons, i. e. organic materials.

I claim:—

1. A chewing gum base comprising rubber as a component thereof, and having a resinous material associated therewith to regulate the hardness of the chewing gum during use, and carrying a soft native mineral in a finely comminuted state in admixture therewith, in such a proportion as to substantially improve the consistency and to reduce any undesirable stickiness of the chewing gum base.

2. The addition of talc to chewing gum material in amount sufficient to reduce undesirable stickiness of the materal during chewing.

3. A chewing gum material containing pulverized talc in amount sufficient to reduce undesirable stickiness of the material during mastication.

4. A chewing gum base comprising rubber as a component thereof, and having a resinous material associated therewith to regulate the hardness of the chewing gum during use, and carrying talc in a finely comminuted state in admixture therewith in amount sufficient to reduce undesirable stickiness of the material during mastication.

5. A chewing gum material containing a mineral substance having a hardness not substantially exceeding 1.5, in a pulverized state, incorporated therein in amount sufficient to reduce undesirable stickiness of the material during mastication.

6. A chewing gum material containing a finely pulverulent very soft siliceous solid mineral lubricant having anti-sticking qualities, in amount sufficient to reduce undesirable stickiness of the material during mastication.

7. Chewing gum material containing a sufficient amount of finely divided solid silicate mineral substance having a hardness not substantially over 1.5, to reduce undesirable stickiness.

8. The step in the manufacture of chewing gum material, of intimately incorporating with the other components of the chewing gum material, a finely powdered insoluble solid mineral having a hardness not substantially over 1.5, in amount sufficient to reduce undesirable stickiness in the gum produced.

9. Chewing gum material containing incorporated therein an added inorganic solid mineral which has a hardness not substantially over 1.5 such product being substantially free from tendency to swell in contact with the saliva of the mouth.

10. Chewing gum material containing distributed therein an added solid mineral lubricant which has a hardness not substantially over 1.5.

11. Chewing gum material containing a rubbery agent and containing talc, both being thoroughly incorporated into the chewing gum material.

12. Chewing gum material containing powdered talc, intimately incorporated therein.

13. Chewing gum material containing an impalpably fine soft siliceous mineral substance, substantially uniformly distributed therein.

14. A chewing gum material which contains a soft silicate mineral substance as a substantial constituent thereof, and distributed throughout the body of said chewing gum material.

15. A process of producing improved chewing gum which comprises absorbing liquid gum-flavoring material in a finely pulverulent solid silicate mineral substance having a hardness not substantially over 1.5, and incorporating the said mineral substance into a chewing gum material, whereby the flavor lasts for a relatively long time.

16. A process of producing improved chewing gum which comprises applying liquid medicine to a finely pulverulent solid silicate mineral substance having a hardness not substantially over 1.5, and incorporating the said mineral substance into a chewing gum material.

17. Chewing gum material containing a normally sticky constituent, the excessive stickiness of which is at least largely overcome by the presence therein of a powdered silicate mineral substance having a hardness not substantially over 1.5, which mineral substance is well distributed in the mass of said chewing gum material.

18. A chewing gum material containing a pulverized insoluble non-poisonous mineral substance which has a hardness not substantially exceeding 1.5 thoroughly incorporated therein in amount sufficient to reduce undesirable stickiness of the gum material during mastication, said mineral substance carrying a medicinal agent absorbed therein.

19. A chewing gum material containing a pulverized insoluble non-poisonous mineral substance which has a hardness not substantially exceeding 1.5 thoroughly incorporated therein in amount sufficient to reduce undesirable stickiness of the gum material during mastication, said mineral substance carrying a flavoring agent absorbed therein.

JOHN O. BARKER.